Patented Jan. 4, 1949

2,457,957

UNITED STATES PATENT OFFICE 2,457,957

INSECTICIDAL COMPOSITION OF PYRETHRINS AND 3,4-OXYMETHYLENE-PHENYL-1-BUTYLGLYCOL SYNERGIST

Herman Wachs, Brooklyn, N. Y., assignor, by mesne assignments, to U. S. Industrial Chemicals, Inc., New York, N. Y., a corporation of Delaware No Drawing. Application March 25, 1946, Serial No. 657,064

4 Claims. (Cl. 167—24)

REISSUED
FEB 13 1951
RE 23341

This invention relates to new insecticidal compositions and more particularly to such compositions comprising mixtures of pyrethrins and the methylene ether of 3.4 oxymethylene-phenyl-1-butylglycol.

The methylene ether of 3.4 oxymethylene-phenyl-1-butylglycol is a known product and is readily prepared by the condensation of isosafrol and formaldehyde according to the directions given by H. J. Prins in Chemische Weekblad, volume 16, pages 1523-1524 (1919).

I have found that the methylene ether of 3.4 oxymethylene-phenyl-1-butylglycol is a valuable synergist for use with pyrethrins. Thus a solution of 30 mg. of pyrethrins and 300 mg. of the methylene ether in 100 c. c. of petroleum base oil (containing a secondary solvent), when tested in the Peet Grady chamber, showed 100% knockdown and 85% kill (O. T. I. kill 46). The synergistic action of the methylene ether is indicated by the fact that a solution containing 30 mg. of pyrethrins in 100 c. c. of petroleum base oil showed a practically negligible kill and a solution of 300 mg. of the methylene ether in 100 c. c. of base oil also showed a practically negligible kill when tested according to the Peet Grady method. The combination of the methylene ether with the pyrethrins, however, showed 85% kill.

The methylene ether itself is insoluble in base oil but can be readily dissolved when a secondary solvent is used. In preparing the solution containing 30 mg. of pyrethrins and 300 mg. of the ether in 100 c. c. of base oil, a secondary solvent is also used. Only very small amounts of the secondary solvent are needed. Among the secondary solvents which can be so used are isopropanol, butyl Carbitol (the butyl ether of diethylene glycol), butyl Cellosolve (the butyl ether of ethylene glycol), velsicol solvents (aromatic closed-chain solvents of petroleum origin) and beta-chloro-beta-thymoxy-diethyl ether.

The proportions of pyrethrins and methylene ether can be varied over a wide range. Instead of using a ratio of 30 mg. of pyrethrins to 300 mg. of the methylene ether per 100 c. c. of petroleum base oil, an insecticidal spray composition of similar activity may be produced by using as little as 5 mg. of pyrethrins per 100 c. c. of petroleum base oil, but in this case the quantity of the methylene ether should be increased to around 1 g.

These proportions given by way of illustration may be varied over a wide range. Thus, a highly efficient household spray may be prepared according to the present example.

1 c. c. of 20:1 pyrethrum extract (the trade designation of a pyrethrum extract containing 2000 mg. of pyrethrins in 100 c. c. of extract), is mixed with 400 mg. of the methylene ether, 300 mg. of beta-chloro-beta-thymoxy-diethyl ether are added and this mixture is diluted to 100 c. c with petroleum base oil.

This example illustrates proportions and amounts suitable for making a small amount of household spray sufficient for test purposes but larger amounts can be produced in a similar manner.

In the above example, the beta-chloro-beta-thymoxy diethyl ether is used as a secondary solvent. Other secondary solvents such as those above mentioned may be similarly used.

The household spray produced in accordance with the above example is highly effective against flying insects such as flies and mosquitoes. Sprays effective against roaches and other more difficult insects can be produced by appropriate variations in the proportions of the pyrethrins and methylene ether, e. g. by raising the pyrethrin content from 20 mg. to 60 mg. per 100 c. c. of petroleum base oil and with a similar amount of the methylene ether to that used in the above example.

The new composition containing pyrethrins and the methylene ether can be made in various forms including not only sprays but also insecticidal powders or in the form of emulsions or suspensions in water or in concentrated solutions to produce a surface paint or spray. The new composition may also be used in combination with other natural or insecticidal materials.

Thus, insecticidal powders can be prepared, for example, by admixing the methylene ether with partially extracted ground pyrethrum flowers. In the manufacture of commercial pyrethrum extracts, the ground pyrethrum flowers which contain around 0.9 to 1.4% pyrethrins are extracted with solvents such as petroleum hydrocarbons. It is economical to extract them only to the point where about 0.1% pyrethrins are still left in the flowers. Such partially extracted pyrethrum flowers may be dried and powdered again to a particle size of about 200 mesh and used for compounding with the methylene ether. Thus, for example, 1.0% of the methylene ether dissolved in a suitable solvent may be added to the dried powder and after thorough mixing a highly active insecticidal powder is obtained which may be used on roaches, ants, silver fish and other household insect pests or which may be used as an agricultural insecticide.

An agricultural dust may also be prepared according to the following example.

A mixture of pyrethrum extract or pyrethrum oleo resin with the methylene ether (a suitable solvent such as isopropanol may be added) is thoroughly mixed with a carrier such as walnut shell flower to give a dust concentrate containing 0.25% of pyrethrins and 2.5% of the methylene ether. This dust concentrate when diluted with 4 parts of an inert material such as pyrophyllite will yield an agricultural dust of outstanding activity.

When the diluted dust is used to the extent of 20 to 35 pounds per acre (depending somewhat on the crop and conditions), it will control a wide variety of agricultural pests such as, Mexican bean beetle, leaf hoppers of various types, cabbage worms, celery leaf tiers, web worms, etc.

The new composition can be prepared in other forms such as emulsions or suspensions in water or concentrated solutions can be produced and used as a surface spray or paint.

The new composition can also be prepared for use in so-called aerosol bombs. An effective spray may thus be prepared containing 0.15% of pyrethrins and 2% of the methylene ether in dichlorodifluoromethane, a solvent that boils below room temperature. Such solutions when stored in a bomb and when the solution is released through fine nozzles to form a so-called aerosol spray give a spray comparable to a solution containing 0.5% of pyrethrins without the methylene ether.

The new insecticidal composition can also be used in combination with other natural or synthetic insecticide materials.

I claim:
1. An insecticidal composition the active insecticidal ingredients of which comprise pyrethrins and as a synergist therefor, 3,4-oxymethylene-phenyl-1-butylglycol.
2. An insecticidal composition in the form of a solution of active insecticidal ingredients in a petroleum base oil, the said ingredients comprising pyrethrins and as a synergist therefor 3,4-oxymethylene-phenyl-1-butyglycol.
3. An insecticidal composition in the form of an insecticidal powder, the active insecticidal ingredients of said composition comprising pyrethrins and as a synergist therefor 3,4-oxymethylene-phenyl-1-butylglycol.
4. An insecticidal composition in the form of an aqueous suspension, the active insecticidal ingredients of said composition comprising pyrethrins and as a synergist therefor 3,4-oxymethylene-phenyl-1-butylglycol.

HERMAN WACHS.

REFERENCES CITED

The following references are of record in the file of this patent:

UNITED STATES PATENTS

| Number | Name | Date |
|---|---|---|
| 1,990,422 | White | Feb. 5, 1935 |

OTHER REFERENCES

Soap and Sanitary Chemicals, Jan. 1943, pages 95 and 96, by Roarck.

Chemische Weekblad, vol. 16, pages 1072-3, 1523-4 (1919), Prins.

Beilstein, vol. 19, (1934) edition, pages 84 and 85.